US008877837B2

(12) United States Patent
Yu et al.

(10) Patent No.: US 8,877,837 B2
(45) Date of Patent: *Nov. 4, 2014

(54) CURING OF EPOXY RESIN COMPOSITIONS COMPRISING CYCLIC CARBONATES USING MIXTURES OF AMINO HARDENERS AND CATALYSTS

(75) Inventors: Miran Yu, Ludwigshafen (DE); Rainer Klopsch, Worms (DE)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/611,604

(22) Filed: Sep. 12, 2012

(65) Prior Publication Data

US 2013/0072595 A1 Mar. 21, 2013

Related U.S. Application Data

(60) Provisional application No. 61/537,077, filed on Sep. 21, 2011.

(51) Int. Cl.
| C08L 63/00 | (2006.01) |
| C08G 59/50 | (2006.01) |
| C09D 163/00 | (2006.01) |
| C09J 163/00 | (2006.01) |
| C08K 5/1565 | (2006.01) |
| C08K 5/109 | (2006.01) |
| C08K 5/17 | (2006.01) |

(52) U.S. Cl.
CPC .............. *C09D 163/00* (2013.01); *C08L 63/00* (2013.01); *C09J 163/00* (2013.01); *C08K 5/109* (2013.01); *C08K 5/1565* (2013.01); *C08K 5/17* (2013.01)
USPC ............. 523/400; 525/526; 525/529; 528/93; 528/116; 528/121

(58) Field of Classification Search
USPC ............. 523/400; 525/529, 526; 528/93, 116, 528/121
See application file for complete search history.

(56) References Cited

U.S. PATENT DOCUMENTS

| 3,781,379 | A | | 12/1973 | Theodore et al. | |
| 4,091,048 | A | | 5/1978 | Labana et al. | |
| 4,874,899 | A | * | 10/1989 | Hoelderich et al. | 568/386 |
| 5,132,458 | A | * | 7/1992 | Honel et al. | 564/367 |
| 5,385,990 | A | * | 1/1995 | Abbey et al. | 525/534 |
| 2004/0044229 | A1 | * | 3/2004 | Hembre et al. | 549/229 |
| 2005/0113594 | A1 | * | 5/2005 | Van Holen | 558/276 |
| 2007/0151666 | A1 | * | 7/2007 | Moeller et al. | 156/327 |
| 2008/0299395 | A1 | | 12/2008 | Strange et al. | 428/409 |
| 2009/0269677 | A1 | * | 10/2009 | Hirose et al. | 429/338 |
| 2010/0160494 | A1 | * | 6/2010 | Yonehama et al. | 523/400 |

FOREIGN PATENT DOCUMENTS

| DE | 1 098 953 | | 2/1961 |
| DE | 2 214 650 | | 10/1972 |
| DE | 27 49 576 | A1 | 5/1979 |
| DE | 32 33 403 | A1 | 3/1984 |
| DE | 34 33 403 | A1 | 3/1986 |
| EP | 0 299 420 | A2 | 1/1989 |
| WO | WO2008143247 | A1 * | 11/2008 |
| WO | WO 2011/157671 | A1 | 12/2011 |

OTHER PUBLICATIONS

Sigma-Aldrich website catalog, http://www.sigmaaldrich.com/catalog/product/aldrich/r395994?lang=en&region=US#, Jul. 2013, p. 1.*
International Search Report issued Nov. 22, 2012 in PCT/EP2012/067809 with Translation of Category of Cited Documents.
U.S. Appl. No. 13/773,028, filed Feb. 21, 2013, Gehringer, et al.
U.S. Appl. No. 13/853,552, filed Mar. 29, 2013, Porta Garcia, et al.

* cited by examiner

*Primary Examiner* — Randy Gulakowski
*Assistant Examiner* — Ha Nguyen
(74) *Attorney, Agent, or Firm* — Oblon, Spivak, McClelland, Maier & Neustadt, L.L.P.

(57) ABSTRACT

A process for curing epoxy resins which comprises curing epoxy resin compositions comprising
a) epoxy resins and
b) a compound of the general formula I $$\text{(I)}$$

in which
$R^1$ and $R^2$ independently of one another are hydrogen, $C_1$-$C_6$-alkyl, $C_1$-$C_4$-alkoxy-$C_1$-$C_4$-alkyl, $C_5$-$C_6$-cycloalkyl, phenyl, phenyl-$C_1$-$C_4$-alkyl, $C_2$-$C_6$-alkenyl or $C_2$-$C_6$-alkynyl, or $R^1$ and $R^2$ together are a $C_3$-$C_{11}$-alkylene group;
$R^3$ and $R^4$ independently of one another are hydrogen, $C_1$-$C_6$-alkyl, $C_1$-$C_4$-alkoxy-$C_1$-$C_4$-alkyl, $C_5$-$C_6$-cycloalkyl, phenyl, phenyl-$C_1$-$C_4$-alkyl, $C_2$-$C_6$-alkenyl or $C_2$-$C_6$-alkynyl, or $R^3$ and $R^4$ together are a $C_4$-$C_6$-alkylene group;
by adding amino hardeners, and the curing takes place in the presence of a compound of the following formula II $$\text{(II)}$$
$$R^{12}-\underset{\underset{R^{11}}{|}}{N}-R^{13}$$

in which at least one of the radicals R11, R12 and R13 is a hydrocarbon group having 1 to 10 C atoms, which is substituted with a hydroxyl group and optionally remaining radicals R11 to R13 are an unsubstituted hydrocarbon group having 1 to 10 C atoms.

11 Claims, No Drawings

CURING OF EPOXY RESIN COMPOSITIONS COMPRISING CYCLIC CARBONATES USING MIXTURES OF AMINO HARDENERS AND CATALYSTS

The present application incorporates by reference Provisional U.S. Application 61/537,077, filed Sep. 21, 2011.

The present invention relates to a process for curing epoxy resin compositions using amine hardeners, which comprises curing epoxy resin compositions comprising
a) epoxy resins and
b) a compound of the general formula I

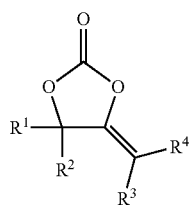

(I)

in which
$R^1$ and $R^2$ independently of one another are hydrogen, $C_1$-$C_6$-alkyl, $C_1$-$C_4$-alkoxy-$C_1$-$C_4$-alkyl, $C_5$-$C_6$-cycloalkyl, phenyl, phenyl-$C_1$-$C_4$-alkyl, $C_2$-$C_6$-alkenyl or $C_2$-$C_6$-alkynyl, or $R^1$ and $R^2$ together are a $C_3$-$C_{11}$-alkylene group;
$R^3$ and $R^4$ independently of one another are hydrogen, $C_1$-$C_6$-alkyl, $C_1$-$C_4$-alkoxy-$C_1$-$C_4$-alkyl, $C_5$-$C_6$-cycloalkyl, phenyl, phenyl-$C_1$-$C_4$-alkyl, $C_2$-$C_6$-alkenyl or $C_2$-$C_6$-alkynyl, or $R^3$ and $R^4$ together are a $C_4$-$C_6$-alkylene group;
by adding amino hardeners, and the curing takes place in the presence of a compound of the following formula II

(II)

in which at least one of the radicals R11, R12 and R13 is a hydrocarbon group having 1 to 10 C atoms, which is substituted with a hydroxyl group and optionally remaining radicals R11 to R13 are an unsubstituted hydrocarbon group having 1 to 10 C atoms.

Epoxy resins (also called epoxide resins) is a customary term for oligomeric compounds having on average more than one epoxy group per molecule. These resins, by reaction with suitable hardeners or by polymerization of the epoxide groups, can be transformed into thermosets. Cured epoxy resins are widespread on account of their outstanding mechanical and chemical properties, such as high impact strength, high abrasion resistance, good chemical resistance, more particularly high resistance toward alkalis, acids, oils, and organic solvents, high weathering stability, excellent adhesiveness to numerous materials, and high electrical insulation capacity.

By reaction with hardeners, the epoxy resin prepolymers are converted into infusible, three-dimensionally "crosslinked", thermoset materials, Suitable hardeners are compounds having at least two functional groups which are able to react with the epoxide groups (also called oxirane groups) and/or hydroxyl groups of the epoxy resin prepolymers to form covalent bonds, examples being compounds having amino groups, hydroxyl groups, and carboxyl groups and/or derivatives thereof, such as anhydrides. Accordingly, as hardeners for epoxy resins, it is customary to use aliphatic and aromatic polyamines, carboxylic anhydrides, polyamidoamines, amino resins or phenolic resins.

The prepolymers used for preparing cured epoxy resins typically have a high viscosity, which hinders application. Moreover, the high viscosity of the resins frequently imposes restrictions on the use of fillers, which are desirable for modifying the mechanical properties of the cured resin material. In many cases, moreover, the use of fillers allows the costs of the products manufactured from the resins, such as moldings or coatings, for example, to be reduced. Frequently, therefore, the uncured epoxy resin is admixed with diluents which reduce the viscosity of the resin to the level desired for the application. Suitable diluents are, in particular, reactive diluents. Reactive diluents are solvents which contain functional groups which react with the epoxide groups of the resin and/or with the functional groups of the hardener to form covalent bonds; they may, for example be compounds which in turn contain oxirane groups. Reactive diluents are more particularly glycidyl ethers of polyfunctional aliphatic alcohols, such as 1,4-butanediol diglycidyl ether, 1,6-hexanediol diglycidyl ether, diethylene glycol diglycidyl ether or glycidyl ethers of trimethylolpropane.

One particularly suitable reactive diluent for epoxy resins is the above-recited compound of the general formula I. Compositions comprising epoxy resins and compounds of the formula I are subject matter of the hitherto unpublished patent application PCT/EP2011/059767.

In the case of the composition described in PCT/EP2011/059767, the viscosity is reduced by addition of the compounds of the formula I. The performance properties, such as the cure rate of the compositions described, for example, are good.

In relation to such compositions, a fundamental task is to improve further the performance properties of the cured epoxy resin compositions. More particularly, even faster cure rates are frequently desirable.

An object of the present invention, therefore, were epoxy resin compositions, or a process for curing epoxy resin compositions, which further improve the cure rate.

The process defined at the outset was found accordingly. Also found were epoxy resin compositions which comprise compounds of the formula I, hardener mixtures and catalysts.

The process of the invention cures epoxy resin compositions comprising
a) epoxy resins and
b) a compound of the general formula I above.

Epoxy resin compositions of this kind have already been described in BASF patent application PCT/EP2011/059767 (BASF reference PF 70167). PCT/EP2011/059767 also discloses particular embodiments for compounds of the formula I, for the epoxy resins, and for uses of epoxy resin formulations comprising compounds of the formula I. Reference is made to the entire disclosure content of PCT/EP2011/059767, and the entire disclosure content of PCT/EP2011/059767 is to be considered here to have been inserted.

The Epoxy Resins

Epoxy resins contemplated include especially those which are commonly used in curable epoxy resin compositions. They include more particularly compounds having 1 to 10 epoxide groups, preferably having at least two epoxide groups in the molecule. The amount of epoxide groups in typical epoxy resins is in the range from 120 to 3000 g/equivalent, calculated as the epoxide equivalent in accordance with DIN 16945.

Preferred among these are what are called glycidyl-based epoxy resins, more particularly those prepared by etherification of aromatic, aliphatic or cycloaliphatic polyols with epichlorohydrin.

Substances of this kind are frequently also referred to as polyglycidyl ethers of aromatic polyols, or as polyglycidyl ethers of aliphatic or cycloaliphatic polyols.

The epoxy resins may be liquid resins, solid resins or mixtures thereof. Liquid resins differ from solid resins in lower viscosity. Liquid resins, moreover, generally have a higher fraction of epoxide groups and, accordingly, a lower epoxide equivalent.

The amount of epoxide groups in typical liquid resins is typically in the range from 120 to 200 g/equivalent, and that of the solid resins is in the range of 450-3000 g/equivalent, calculated as the epoxide equivalent in accordance with DIN 16945.

The viscosity of the liquid resins at 25° C. is typically in the range from 1 to 20 Pas, preferably in the range from 5 to 15 Pas. The viscosity of the solid resins at 25° C. is typically in the 5 to 40 Pas range, preferably in the range from 20 to 40 Pas. The viscosities indicated here are the figures determined in accordance with DIN 53015 at 25° C. for 40% strength solutions of the resins in methyl ethyl ketone.

Examples of suitable epoxy resins are those available commercially under the branded designations EPILOX®, EPONEX®, EPIKOTE®, EPONOL®, D.E.R, ARALDIT® or ARACAST®.

In one preferred embodiment the epoxy resin is selected from polyglycidyl ethers of aromatic polyols. Examples thereof are the resins derived from the diglycidyl ether of bisphenol A (DGEBA resins, R'=CH$_3$), and the resins derived from bisphenol F (R'=H), which may be described by the following general formula:

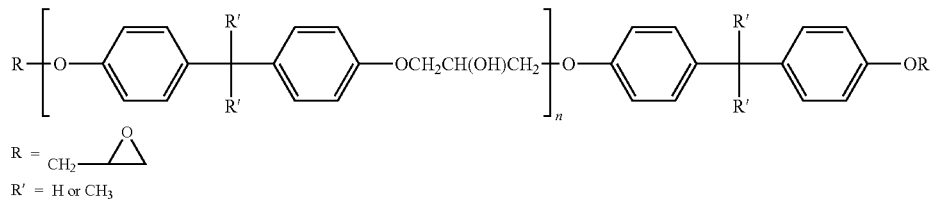

In the formula, the parameter n indicates the number of repeating units, with the average value of n corresponding to the respective average molecular weight.

Examples of epoxy resins based on polyglycidyl ethers of aromatic polyols further include glycidyl ethers of phenol-based and cresol-based novolaks. Novolaks are prepared by the acid-catalyzed condensation of formaldehyde and phenol or cresol. Reaction of the novolaks with epichlorohydrin gives the glycidyl ethers of the novolaks.

In another preferred embodiment of the invention the epoxy resin is selected from polyglycidyl ethers of cycloaliphatic polyols and from the polyglycidyl esters of cycloaliphatic polycarboxylic acids. Examples of polyglycidyl ethers of cycloaliphatic polyols are the ring hydrogenation products of polyglycidyl ethers based on bisphenol A, the ring hydrogenation products of polyglycidyl ethers based on bisphenol F, the ring hydrogenation products of polyglycidyl ethers based on novolaks, and mixtures thereof. Compounds of this kind are typically prepared by selective hydrogenation of the aromatic rings in the aforementioned aromatic polyglycidyl ethers. Examples of such products are P 22-00 from LeunaHarze and Eponex 1510 from Hexion. An example of polyglycidyl esters of cycloaliphatic polycarboxylic acids is diglycidyl hexahydrophthalate.

Suitable epoxy resins for coating formulations also include polyacrylate resins containing epoxide groups. These resins are prepared generally by copolymerizing at least one ethylenically unsaturated monomer which contains at least one epoxide group in the molecule, more particularly in the form of a glycidyl ether group, with at least one further ethylenically unsaturated monomer which contains no epoxide group in the molecule, with preferably at least one of the comonomers being an ester of acrylic acid or methacrylic acid. Examples of the ethylenically unsaturated monomers which contain at least one epoxide group in the molecule are glycidyl acrylate, glycidyl methacrylate, and allyl glycidyl ether. Examples of ethylenically unsaturated monomers which contain no epoxide group in the molecule are alkyl esters of acrylic and methacrylic acid which contain 1 to 20 carbon atoms in the alkyl radical, more particularly methyl acrylate, methyl methacrylate, ethyl acrylate, ethyl methacrylate, butyl acrylate and butyl methacrylate, 2-ethylhexyl acrylate and 2-ethylhexyl methacrylate. Further examples of ethylenically unsaturated monomers which contain no epoxide groups in the molecule are acids, such as acrylic acid and methacrylic acid, acid amides, such as acrylamide and methacrylamide, for example, vinylaromatic compounds, such as styrene, methylstyrene, and vinyltoluene, nitriles, such as acrylonitrile and methacrylonitrile, vinyl halides and vinylidene halides, such as vinyl chloride and vinylidene fluoride, vinyl esters, such as vinyl acetate, for example, and hydroxyl-containing monomers, such as hydroxyethyl acrylate and hydroxyethyl methacrylate, for example. The polyacrylate resin containing epoxide groups typically has an epoxide equivalent weight of 400 to 2500, preferably 500 to 1500, more preferably 600 to 1200. The number-average molecular weight (determined by gel permeation chromatography using a polystyrene standard) is situated typically in the range from 1000 to 15000, preferably from 1200 to 7000, more preferably from 1500 to 5000. The glass transition temperature (TG) is situated typically in the range from 30 to 80° C., preferably from 40 to 70° C., more preferably from 50 to 70° C. (measured by means of differential scanning calorimetry (DSC)). Polyacrylate resins containing epoxide groups are known (cf., e.g., EP-A-299 420, DE-B-22 14 650, DE-B-27 49 576, U.S. Pat. Nos. 4,091,048, and 3,781,379). Examples of such resins are Epon 8021, Epon 8111, and Epon 8161 from Hexion.

The epoxy resins may also derive from other epoxides (non-glycidyl ether epoxy resins). These include more particularly compounds, including oligomers and polymers, which have at least one, more particularly two or more, epoxidized cycloaliphatic group(s), more particularly 7-oxabicyclo[4.1.0]heptyl groups, which are obtainable by epoxidizing compounds having cyclohexenyl groups. Examples of the epoxidation products of compounds having at least one cycloolefinic group are 4-epoxyethyl-1,2-epoxycyclohexane and the compound of the following formula:

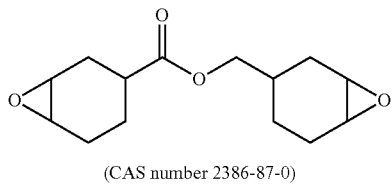

(CAS number 2386-87-0)

which is sold, for example, by Cytec under the designation Uvacure 1500. It is preferred to use the compounds which have at least one, more particularly two or more, epoxidized cycloaliphatic group(s), more particularly 7-oxabicyclo[4.1.0]heptyl groups, which are obtainable by epoxidizing compounds having cyclohexenyl groups, and oligomers thereof, not alone but instead in combination with one or more of the aforementioned substances having at least two glycidyl ether groups in the molecule.

Compounds of the Formula I

Preferred compounds of the formula (I) are those in which the radicals $R^1$, $R^2$, $R^3$, and $R^4$ independently of one another have one or more of the following definitions:

$R^1$ is selected from hydrogen, $C_1$-$C_6$-alkyl, more particularly $C_1$-$C_4$-alkyl, more preferably methyl, ethyl, n-propyl, and isopropyl, more particularly methyl and ethyl, $C_1$-$C_4$-alkoxy-$C_1$-$C_4$-alkyl, $C_5$-$C_6$-cycloalkyl, more particularly cyclohexyl, phenyl, phenyl-$C_1$-$C_4$-alkyl, more particularly benzyl, $C_2$-$C_6$-alkenyl, and $C_2$-$C_6$-alkynyl;

$R^2$ is selected from hydrogen, $C_1$-$C_6$-alkyl, more particularly $C_1$-$C_4$-alkyl, more preferably methyl, ethyl, n-propyl, and isopropyl, especially methyl or ethyl, $C_1$-$C_4$-alkoxy-$C_1$-$C_4$-alkyl, $C_5$-$C_6$-cycloalkyl, more particularly cyclohexyl, phenyl, phenyl-$C_1$-$C_4$-alkyl, more particularly benzyl, $C_2$-$C_6$-alkenyl, and $C_2$-$C_6$-alkynyl;

$R^1$ and $R^2$ may also together be a $C_3$-$C_{11}$-alkylene group, preferably a $C_4$-$C_6$-alkylene group, such as for example 1,4-butanediyl, 1,5-pentanediyl or 1,6-hexanediyl, more particularly a linear $C_5$-alkylene group (1,5-pentanediyl);

$R^3$ is selected from hydrogen, $C_1$-$C_6$-alkyl, $C_1$-$C_4$-alkoxy-$C_1$-$C_4$-alkyl, $C_5$-$C_6$-cycloalkyl, phenyl, phenyl-$C_1$-$C_4$-alkyl, $C_2$-$C_6$-alkenyl, and $C_2$-$C_6$-alkynyl.

$R^4$ is selected from hydrogen, $C_1$-$C_6$-alkyl, $C_1$-$C_4$-alkoxy-$C_1$-$C_4$-alkyl, $C_5$-$C_6$-cycloalkyl, phenyl, phenyl-$C_1$-$C_4$-alkyl, $C_2$-$C_6$-alkenyl, and $C_2$-$C_6$-alkynyl.

$R^3$ and $R^4$ may also together be a $C_4$-$C_6$-alkylene group, such as for example 1,4-butanediyl, 1,5-pentanediyl or 1,6-hexanediyl.

Preferably at least one of the radicals $R^1$, $R^2$, $R^3$, and $R^4$ is not hydrogen. More particularly one of the radicals $R^1$ or $R^2$ is not hydrogen.

In preferred compounds of the formula I, at least one of the radicals $R^3$ and $R^4$ is hydrogen. More preferably both radicals $R^3$ and $R^4$ are hydrogen.

With regard to their use in accordance with the invention, particularly preferred compounds of the formula (I) are those in which the radicals $R^1$ and $R^2$ have the definitions below, with the radicals $R^3$ and $R^4$ having the definitions indicated above, and preferably one of the radicals, $R^3$ or $R^4$, being hydrogen, and more particularly both radicals, $R^3$ and $R^4$, being hydrogen:

$R^1$ is selected from hydrogen and $C_1$-$C_4$-alkyl, more particularly hydrogen, methyl or ethyl;

$R^2$ is selected from $C_1$-$C_4$-alkyl, $C_1$-$C_4$-alkoxy-$C_1$-$C_4$-alkyl, $C_5$-$C_6$-cycloalkyl, phenyl, phenyl-$C_1$-$C_4$-alkyl, $C_2$-$C_6$-alkenyl, and $C_2$-$C_6$-alkynyl, more particularly $C_1$-$C_4$-alkyl and $C_1$-$C_4$-alkoxy-$C_1$-$C_4$-alkyl, and especially from methyl or ethyl.

In one likewise particularly preferred embodiment of the invention, $R^1$ and $R^2$ together are a $C_4$-$C_6$-alkylene group, such as for example 1,4-butanediyl, 1,5-pentanediyl or 1,6-hexanediyl, more particularly a linear $C_5$-alkylene group (1,5-pentanediyl). In this particularly preferred embodiment, the radicals $R^3$ and $R^4$ have the definitions indicated above, with preferably one of the radicals, $R^3$ or $R^4$, being hydrogen, and more particularly both radicals, $R^3$ and $R^4$, being hydrogen.

In a likewise particularly preferred embodiment of the invention, $R^1$ and $R^2$ independently of one another are $C_1$-$C_4$-alkyl, more particularly methyl or ethyl. In this very particularly preferred embodiment, the radicals $R^3$ and $R^4$ have the definitions indicated above, with preferably one of the radicals, $R^3$ or $R^4$, being hydrogen, and more particularly both radicals, $R^3$ and $R^4$, being hydrogen.

Particularly preferred accordingly are compounds of the general formula Ia

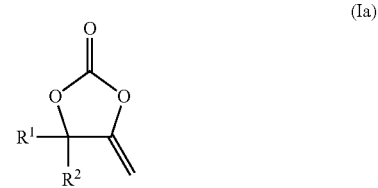

(Ia)

in which $R^1$ and $R^2$ have one of the definitions given above, and mixtures thereof. Particularly preferred compounds of the general formula Ia are those in which $R^1$ and $R^2$ show the definitions described in table 1.

TABLE 1

Examples of compounds of the formula Ia of the invention

| No. | $R^1$ | $R^2$ |
|---|---|---|
| 1 | Methyl | Phenyl |
| 2 | Methyl | H |
| 3 | Methyl | Methyl |
| 4 | Methyl | n-Propyl |
| 5 | Methyl | Isopropyl |
| 6 | Methyl | n-Butyl |
| 7 | Methyl | Isobutyl |
| 8 | Ethyl | H |
| 9 | Ethyl | Methyl |
| 10 | Ethyl | Ethyl |
| 11 | Ethyl | Isopropyl |
| 12 | Ethyl | n-Butyl |
| 13 | | n-Butanediyl |
| 14 | | n-Pentanediyl |
| 15 | | n-Heptanediyl |
| 16 | | n-Undecanediyl |
| 17 | H | H |
| 18 | H | Methyl |
| 19 | H | n-Propyl |
| 20 | H | Isopropyl |
| 21 | H | n-Butyl |
| 22 | H | Isobutyl |
| 23 | H | Phenyl |

Of these, the following compounds and mixtures thereof are preferred particularly:

4,4-Diethyl-5-methylene-1,3-dioxolan-2-one
4,4-Dimethyl-5-methylene-1,3-dioxolan-2-one
4-Methyl-5-methylene-1,3-dioxolan-2-one
4-Ethyl-5-methylene-1,3-dioxolan-2-one
4-Ethyl-4-methyl-5-methylene-1,3-dioxolan-2-one
4-Isopropyl-5-methylene-1,3-dioxolan-2-one
4-Isopropyl-4-methyl-5-methylene-1,3-dioxolan-2-one
4-Methylene-1,3-dioxaspiro[4.5]decan-2-one
4-Phenyl-4-methyl-5-methylene-1,3-dioxolan-2-one
4-n-Propyl-5-methylene-1,3-dioxolan-2-one
4-n-Propyl-4-methyl-5-methylene-1,3-dioxolan-2-one
4-Methylene-1,3-dioxolan-2-one Especially preferred compounds of formula Ia are those where $R^1$ and $R^2$ independently of one another are $C_1$-$C_4$-alkyl, more particularly methyl or ethyl.

The compounds of the formulae I, which in the text below are also referred to as exo-vinylene carbonates, are known in principle from the prior art, as for example from DE 1098953 or DE 3433403.

Compounds of the formula I in which as least one of the two radicals $R^3$ and $R^4$ is hydrogen may be prepared, for example, by reaction of optionally substituted propargyl alcohols with $CO_2$ or with a carboxylic anhydride in the presence of a catalyst, as is also described in PCT/EP2011/059767.

Compounds of the formula I in which one or both radicals $R^3$ and $R^4$ is or are a radical other than hydrogen may be prepared starting from compounds of the formula I in which both radicals $R^3$ and $R^4$ are hydrogen by Heck coupling, as for example in analogy to the method described in Tetrahedron Lett. 2000, 5527-5531.

In the epoxy resin compositions, the compounds of the formula I produce a reduction in the viscosity and an increase in the reactivity, the latter especially in the case of aminic curing. Generally speaking, the desired dilution effect and the increased reactivity are evident even with a low level of the compound of the formulae I present. Generally speaking, the compound or compounds of the formulae I will be used in a total amount of at least 0.001 part by weight, frequently at least 0.005 part by weight, more particularly at least 0.01 part by weight, based on 1 part by weight of the epoxy resins. The compound or compounds of the formulae I will frequently be used in a total amount of not more than 1 part by weight, preferably not more than 0.7 part by weight, more particularly not more than 0.5 part by weight, based on 1 part by weight of the epoxy resin component.

Within the epoxy resin compositions, accordingly, the total amounts of compounds of the formulae I is generally 0.1% to 50%, frequently 0.5 to 40%, and more particularly 1 to 30%, by weight, based on the sum total weight of compounds of the formulae I and epoxy resins.

Further Constituents of the Epoxy Resin Composition

Besides the epoxy resins and the compounds of the formula I, the epoxy resin compositions may also comprise conventional reactive diluents. By these are meant, in particular, compounds of low molecular weight, having a molecular weight of preferably not more than 250 daltons, e.g., in the range from 100 to 250 daltons, which contain oxirane groups, preferably glycidyl groups, in the form, for example, of glycidyl ether groups, glycidyl ester groups or glycidylamide groups. The epoxide functionality, i.e., the number of epoxide groups per molecule, in the case of the reactive diluents is typically in the range from 1 to 3, more particularly in the range from 1.2 to 2.5. Particularly preferred among these are glycidyl ether of aliphatic or cycloaliphatic alcohols which have preferably 1, 2, 3 or 4 OH groups and 2 to 20 or 4 to 20 C atoms, and also glycidyl ethers of aliphatic polyetherols which have 4 to 20 C atoms. Examples thereof are as follows:

glycidyl ethers of saturated alkanols having 2 to 20 C atoms, such as $C_2$-$C_{20}$-alkyl glycidyl ethers such as 2-ethylhexyl glycidyl ether, for example;

glycidyl ethers of saturated alkane polyols having 2 to 20 C atoms, examples being the glycidyl ethers of 1,4-butanediol, 1,6-hexanediol, trimethylolpropane or of pentaerythritol, the aforementioned glycidyl ether compounds generally having an epoxide functionality in the range from 1 to 3.0 and preferably in the range from 1.2 to 2.5;

glycidyl ethers of polyetherols having 4 to 20 C atoms, examples being glycidyl ethers of diethylene glycol, triethylene glycol, tetraethylene glycol, dipropylene glycol or tripropylene glycol;

glycidyl ethers of cycloaliphatic alcohols having 5 to 20 C atoms, such as, for example, bisglycidyl ethers of cyclohexane-1,4-diyl, or the bisglycidyl ether of ring-hydrogenated bisphenol A or of ring-hydrogenated bisphenol F, glycidyl ethers of polyalkylene oxides having 2 to 4 C atoms such as polyethylene oxide or polypropylene oxide;

and mixtures of the aforesaid substances.

Where desired, the conventional reactive diluents are used in the formulations of the invention in a total amount of at least 0.01 part by weight, frequently at least 0.02 part by weight, more particularly at least 0.05 part by weight, based on 1 part by weight of the epoxy resins. Since the compounds of the formula I compensate or even overcompensate the reduction in reactivity frequently brought about by conventional reactive diluents, the conventional reactive diluents can be used in a greater amount than in the prior art. In general, however, the conventional reactive diluents will be used in a total amount of not more than 1 part by weight, preferably not more than 0.8 part by weight, more particularly not more than 0.7 part by weight, based on 1 part by weight of the epoxy resin component. The total amount of conventional reactive diluent plus compound of the formula I is preferably not more than 1.1 parts by weight, more particularly not more than 1 part by weight, and especially not more than 0.9 part by weight, based on 1 part by weight of the epoxy resins. Where the epoxy resin compositions of the invention comprise one or more conventional reactive diluents, the weight ratio of compound of the formula I to conventional reactive diluent is situated typically in the range from 1:100 to 100:1, more particularly in the range from 1:50 to 50:1.

The conventional reactive diluent more particularly will make up not more than 10% by weight, based on the total amount of reactive diluent+compound I. In another particular embodiment of the invention, the weight ratio of compound I to conventional reactive diluent is situated in the range from 1:10 to 10:1, more particularly in the range from 1:5 to 5:1, and especially in the range from 1:2 to 2:1.

The epoxy resin compositions may also, furthermore, comprise inert organic diluents. By these are meant organic solvents which at atmospheric pressure have a boiling point of below 200° C. and which do not enter into any bond-forming reaction with the epoxide groups and with the groups of any reactive diluent optionally present. Such diluents are typically organic solvents, examples being ketones having preferably 3 to 8 C atoms such as acetone, methyl ethyl ketone, cyclohexanone, and the like, esters of aliphatic carboxylic acids, preferably of acetic acid, of propionic acid or of butanoic acid, more particularly the $C_1$-$C_6$-alkyl esters of these acids such as ethyl acetate, propyl acetate, and butyl acetate, aromatic hydrocarbons, especially alkylaromatics such as, for example, toluene, mesitylene, 1,2,4-trimethylbenzene, n-propyl-benzene, isopropylbenzene, cumene, or xylenes, and mixtures of alkylaromatics, more particularly technical mixtures of the kind available commercially, for example, as Solvesso grades, and aliphatic and cycloaliphatic hydrocarbons, and also alkanols having preferably 1 to 8 C atoms and cycloalkanols having preferably 5 to 8 C atoms, such as methanol, ethanol, n- and isopropanol, butanols, hexanols, cyclopentanol and cyclohexanol, and the like.

In one preferred embodiment the epoxy resin composition comprises inert organic solvents at most in minor amounts (less than 20% by weight, in particular less than 10% by weight or less than 5% by weight, based on the sum total weight of epoxy resin and compound of the formula I) and with particular preference no such solvent (100% system).

Besides the aforementioned constituents, the epoxy resin composition may comprise the additives and/or fillers that are customary for such compositions.

Examples of suitable fillers include inorganic or organic particulate materials such as, for example, calcium carbonates and silicates and also inorganic fiber materials such as glass fibers, for example. Organic fillers such as carbon fibers and mixtures of organic and inorganic fillers, such as mixtures of glass fibers and carbon fibers or mixtures of carbon fibers and inorganic fillers, for example, may also find application. The fillers can be added in an amount of 1% to 70% by weight, based on the total weight of the composition.

Suitable conventional additives comprise, for example, antioxidants, UV absorbers/light stabilizers, metal deactivators, antistats, reinforcers, fillers, antifogging agents, blowing/propelling agents, biocides, plasticizers, lubricants, emulsifiers, colorants, pigments, rheological agents, impact tougheners, catalysts, adhesion regulators, optical brighteners, flame retardants, antidropping agents, nucleating agents, solvents, and reactive diluents, and also mixtures of these.

The optionally used light stabilizers/UV absorbers, antioxidants, and metal deactivators preferably have a high migration stability and temperature stability. They are selected, for example, from groups a) to t). The compounds of groups a) to g) and i) constitute light stabilizers/UV absorbers, while compounds j) to t) act as stabilizers.
a) 4,4-diarylbutadienes,
b) cinnamic esters,
c) benzotriazoles,
d) hydroxybenzophenones,
e) diphenylcyanoacrylates,
f) oxamides,
g) 2-phenyl-1,3,5-triazines,
h) antioxidants,
i) nickel compounds,
j) sterically hindered amines,
k) metal deactivators,
l) phosphites and phosphonites,
m) hydroxylamines,
n) nitrones,
o) amine oxides,
p) benzofuranones and indolinones,
q) thiosynergists,
r) peroxide-destroying compounds,
s) polyamide stabilizers, and
t) basic costabilizers.
The Amino Hardeners The epoxy resin composition which comprises epoxy resins, one or more compounds of the formula I, and optionally further constituents, is cured in accordance with the invention by addition of amino hardeners.

Amine hardeners crosslink epoxy resins by reaction of the primary or secondary amino functions of the polyamines with terminal epoxide groups of the epoxy resins. Such amine hardeners have at least two amino groups; generally they have 2 to 6, more particularly 2 to 4, amino groups. The amino groups may be primary or secondary amino groups.

Customary amine hardeners are, for example,
aliphatic polyamines such as ethylenediamine, 1,2- and 1,3-propanediamine, neopentanediamine, hexamethylenediamine, octamethylenediamine, 1,10-diaminodecane, 1,12-diaminododecane, diethylenetriamine, triethylenetetramine, tetraethylenepentamine, trimethylhexamethylenediamine, 1-(3-aminopropyl)-3-aminopropane, 1,3-bis(3-aminopropyl)propane, 4-ethyl-4-methylamino-1-octylamine, and the like;
cycloaliphatic diamines, such as 1,2-diaminocyclohexane, 1,3-bis(aminomethyl)-cyclohexane, 1-methyl-2,4-diaminocyclohexane, 4-(2-aminopropan-2-yl)-1-methylcyclohexane-1-amine, isophoronediamine, 4,4'-diaminodicyclohexylmethane, 3,3'-dimethyl-4,4'-diaminodicyclohexylmethane, 4,8-diaminotricyclo [5.2.1.0]decane, norbornanediamine, menthanediamine, menthenediamine, and the like;
aromatic diamines, such as tolylenediamine, xylylenediamine, especially meta-xylylenediamine, bis(4-aminophenyl)methane (MDA or methylenedianiline), bis (4-aminophenyl) sulfone (also known as DADS, DDS or dapsone), and the like;
cyclic polyamines, such as piperazine, N-aminoethylpiperazine, and the like;
polyetheramines, especially difunctional and trifunctional primary polyetheramine based on polypropylene glycol, polyethylene glycol, polybutylene oxide, poly(1,4-butanediol), polyTHF or polypentylene oxide, e.g., 4,7,10-trioxamidecane-1,3-diamine, 4,7,10-trioxamidecane-1, 13-diamine, 1,8-diamino-3,6-dioxaoctane (XTJ-504 from Huntsman), 1,10-diamino-4,7-dioxadecane (XTJ-590 from Huntsman), 1,12-diamino-4,9-dioxadodecane (BASF SE), 1,3-diamino-4,7,10-trioxamidecane (BASF), primary polyetheramines based on polypropylene glycol having an average molar mass of 230 such as, for example, polyetheramine D 230 (BASF SE) or Jeffamine® D 230 (Huntsman), difunctional, primary polyetheramines based on polypropylene glycol having an average molar mass of 400, e.g. polyetheramine D 400 (BASF SE) or Jeffamine® XTJ 582 (Huntsman), difunctional, primary polyetheramines based on polypropylene glycol having an average molar mass of 2000 such as, for example, polyetheramine D 2000 (BASF SE), Jeffamine® D2000 or Jeffamine® XTJ 578 (Huntsman), difunctional, primary polyetheramines based on propylene oxide having an average molar mass of 4000 such as, for example, polyetheramine D 4000 (BASF SE), trifunctional, primary polyetheramines prepared by reacting propylene oxide with trimethylolpropane followed by an amination of the terminal OH groups, having an average molar mass of 403, such as, for example, polyetheramine T 403 (BASF SE) or Jeffamine® T 403 (Huntsman), trifunctional, primary polyetheramine prepared by reacting propylene oxide with glycerol, followed by an amination of the terminal OH groups, having an average molar mass of 5000, such as, for example, polyetheramine T 5000 (BASF SE) or Jeffamine® T 5000 (Huntsman), aliphatic polyetheramines constructed from a propylene oxide-grafted polyethylene glycol and having an average molar mass of 600, such as, for example, Jeffamine® ED-600 or Jeffamine® XTJ 501 (each Huntsman), aliphatic polyetheramines constructed from a propylene oxide-grafted polyethylene glycol and having an average molar mass of 900, such as, for example, Jeffamine® ED-900 (Huntsman), aliphatic polyetheramines constructed from a propylene oxide-grafted polyethylene glycol and having an average molar mass of 2000, such as, for example, Jeffamine® ED-2003 (Huntsman), difunctional, primary polyetheramine prepared by amination of a propylene oxide-grafted diethylene glycol, having an average molar mass of 220, such as, for example, Jeffamine® HK-511 (Huntsman), aliphatic polyetheramines based on a copolymer of poly(tetramethylene ether glycol) and polypropylene glycol having an average molar mass of 1000 such as, for example, Jeffamine® XTJ-542 (Huntsman), aliphatic polyetheramines based on a copolymer of poly(tetramethylene ether glycol) and polypropylene glycol having an average molar mass of 1900, such as, for example, Jeffamine® XTJ-548 (Huntsman), aliphatic polyetheramines based on a copolymer of poly(tetramethylene ether glycol) and polypropylene glycol having an average molar mass of 1400 such as, for example, Jeffamine® XTJ-559 (Huntsman), polyethertriamines based on a butylene oxide-grafted alcohol having a functionality of at least three, having an average molar mass of 400, such as, for example, Jeffamine® XTJ-566 (Huntsman), aliphatic polyetheramines prepared by amination of butylene oxide-grafted alcohols having an average molar mass of 219, such as, for example, Jeffamine® XTJ-568 (Huntsman), polyetheramines based on pentaerythritol and propylene oxide having an average molar mass of 600 such as, for example, Jeffamine® XTJ-616 (Huntsman), polyetheramines based on triethylene glycol having an average molar mass of 148, e.g., Jeffamine® EDR-148 (Huntsman), difunctional, primary polyetheramines prepared by amination of a propylene oxide-grafted ethylene glycol, having an average molar mass of 176, such as, for example, Jeffamine® EDR-176 (Huntsman), and also polyetheramines prepared by amination of poly-THF having an average molar mass of 250, e.g., Poly-THF-amine 350 (BASF SE), and mixtures of these amines;

polyamidoamines (amidopolyamines), which are obtainable by reaction of polycarboxylic acids, more particularly dicarboxylic acids such as adipic acid or dimeric fatty acids (e.g., dimeric linoleic acid) with polyamines of low molecular weight, such as diethylenetriamine, 1-(3-aminopropyl)-3-aminopropane or triethylenetetramine, or other diamines, such as the aforementioned aliphatic or cycloaliphatic diamines, or alternatively are obtainable by Michael addition of diamines with acrylic esters and subsequent polycondensation of the resultant amino acid esters, or phenalkamines (also phenolalkanamines), meaning phenol or phenol derivatives which are substituted on at least one C atom of the ring system by hydrocarbon groups which contain primary or secondary amino groups; apart from the hydroxyl group of the phenol or phenol derivative and the primary or secondary amino groups, the phenalkamines contain no further functional groups. In particular the phenalkamines contain not only primary but also secondary amino groups. Highly suitable phenalkamines contain preferably a total of 2 to 10, more particularly 2 to 8, and, in one particular embodiment, 4 to 6 such amino groups; preferably they are phenalkamines based on cardanol, which is present in cashew nut shell oil; cardanol-based phenalkamines are substituted on at least one C atom, preferably on one to three C atoms, of the ring system by above-described, preferably aliphatic hydrocarbon groups containing primary or secondary amino groups. These substituents are located more particularly in positions ortho or para to the hydroxyl group; phenalkamines can be prepared by Mannich reaction from the phenol or phenol derivative, from an aldehyde, and from a compound having at least one primary or secondary amino group. The phenalkamines are therefore Mannich bases or adducts of amino compounds, more particularly one of the above amino compounds, with epoxide compounds and also mixtures of the aforementioned amine hardeners.

In a preferred embodiment, 0.1% to 50% by weight of the amino hardeners used are aliphatic, cycloaliphatic or aromatic amine compounds having 1 to 4 primary amino groups and optionally further functional groups, selected from secondary amino groups, tertiary amino groups, and hydroxyl groups, the primary amino groups in the case of the cycloaliphatic and aromatic amine compounds being attached in the form of aminomethylene groups ($H_2N$—$CH_2$—) to the cycloaliphatic or aromatic ring system.

These amine hardeners will also be referred to below for short as co-hardeners, while other amine hardeners, which do not fall within the above definition of the co-hardeners, will be referred to below simply as hardeners.

The Co-hardeners

Co-hardeners may be aliphatic, cycloaliphatic or aromatic amine compounds.

Apart from secondary or tertiary amino groups or hydroxyl groups, the co-hardeners having 1 to 4 primary amino groups contain no further functional groups.

Preferred co-hardeners are, for example, aliphatic amine compounds which apart from a primary amino group contain no further functional groups, examples being C2 to C8 alkyleneamines, such as ethylamine, propylamine or butylamine.

Preferred co-hardeners are, for example, also linear or branched aliphatic amine compounds which contain two primary amino groups and otherwise no further functional groups, examples being C2 to C8 alkylenediamines, such as ethylenediamine, propylenediamine or butylenediamine.

Preferred co-hardeners are, for example, also aliphatic amine compounds which contain one or two primary amino groups and one or two hydroxyl groups, and otherwise no further functional groups, examples being monoamines, such as C2 to C8 alkanolamines, such as ethanolamine, isopropanolamine.

Preferred co-hardeners are also, for example, aliphatic amine compounds which contain a primary amino group and a tertiary amino group but otherwise no further functional groups. Examples include compounds of the formula III

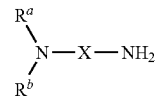

In formula III, $R^a$ and $R^b$ independently of one another are a C1 to 10, preferably a C1 to C4 alkyl group. X is a C2 to C10, preferably a C2 to C4 alkylene group. The alkylene group may be branched or linear; it is substituted at any desired location by the tertiary and the primary amino groups. In one preferred embodiment the alkylene group is linear and is substituted terminally by the tertiary and primary amino group. An example that may be given of one of the co-hardeners particularly preferred here is 3-dimethylaminopropylamine (DMAPA).

Preferred co-hardeners are also aliphatic amine compounds which contain one or two primary amino groups, preferably one primary amino group, and one secondary amino group, and one hydroxyl group, but otherwise no further functional groups. These are, more particularly, N-(2-aminoalkyl)alkanolamines, e.g., N-(2-aminoethyl)ethanolamine ($H_2N-CH_2-CH_2-NH-CH_2-CH_2-OH$). The two alkylene groups in these compounds have are preferably composed of 2 to 8 C atoms.

Preferred aromatic co-hardeners are also, for example, benzene substituted by one to three aminomethylene groups ($H_2N-CH_2-$). More particularly this is benzene substituted by two $H_2N-CH_2-$ groups in any desired position on the benzene ring, an example being xylenediamine with the formula

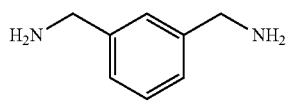

Preferred cycloaliphatic co-hardeners are also, for example, cyclohexane substituted by one to three aminomethylene groups ($H_2N-CH_2-$). More particularly this is cyclohexane substituted by two $H_2N-CH_2-$ groups at any desired position on the benzene ring.

Also contemplated, of course, are any desired mixtures of the above co-hardeners.

The co-hardeners preferably have a molecular weight of less than 500 g/mol, more particularly less than 300 g/mol.

Preferred co-hardeners are composed in total of a maximum of 10 C atoms; particularly preferred co-hardeners are composed in total of a maximum of 8 C atoms.

Of the co-hardeners identified above, the aliphatic compounds are preferred; particularly preferred aliphatic compounds are those having only one primary amino group and optionally one tertiary amino group or optionally one hydroxyl group and otherwise no further functional group.

The weight fraction of the co-hardeners is preferably from 2% to 40% by weight, more preferably from 5% to 35% by weight, based on the sum total weight of all amino hardeners.

The co-hardeners are used preferably in amounts of 0.1 to 30 parts by weight, more preferably in amounts of 0.5 to 20 parts by weight, based on epoxy resins a).

The amine hardeners used in addition to the co-hardeners are amine hardeners which do not fall within the above definition of the co-hardeners, and they are referred to below, as mentioned above, simply as hardeners. The fraction of these hardeners is then, correspondingly, preferably 60% to 98% by weight, more preferably 65% to 95% by weight, based on the sum total weight of all amine hardeners.

Hardeners of this kind are, for example, polyamidoamines, phenalkamines, epoxy-amine adducts, polyetheramines, or other amine compounds or mixtures thereof that are different from the co-hardeners.

The hardeners are preferably polyamidoamines, phenalkamines, epoxy-amine adducts, polyetheramines or mixtures thereof.

If co-hardeners and hardeners are used, they can be mixed beforehand and then added as a mixture to the epoxy resin composition, but they may also be added separately. They may also be added simultaneously or in conjunction with other constituents of the epoxy resin composition. Suitable such constituents include, for example, the additives identified above.

The amount of amine hardener, or co-hardener and hardener, needed for curing is determined in a conventional way by the number of epoxide groups in the formulation and the number of functional groups in the hardener. The number of epoxide groups in the epoxy resin is expressed in the form of what is called the epoxide equivalent. The epoxide equivalent is determined in accordance with DIN 16945.

The number of primary and secondary amino groups can be calculated via the amine number in accordance with DIN 16945.

The amine hardeners are preferably used overall in amounts such that the ratio of the number of all primary and secondary amino groups to the number of all epoxide groups in the epoxy resin is 2:1 to 1:2, preferably 1.5:1 to 1:1.5, and more particularly about 1:1. In the case of a stoichiometric ratio of approximately 1:1, a cured resin is obtained which has optimum thermoset properties. Depending on the desired properties of the resin after crosslinking, however, it may also be useful to use hardener and epoxy resin in different ratios of the reactive groups.

In the epoxy resin compositions, accordingly, the total amount of amine hardeners, or sum of co-hardeners and hardeners is generally 0.1% to 50%, frequently 0.5% to 40%, and more particularly 1% to 30%, by weight, based on the sum total weight of epoxy resin a), compounds of the formulae I, co-hardeners, and hardeners.

Besides the amine hardener mixture used in accordance with the invention it is also possible for other hardeners to be used as well, such as anhydride hardeners, for example. In one preferred embodiment, however, exclusively amine compounds are used.

In accordance with the invention, curing with the amine hardeners takes place in the presence of a compound of the formula II below

(II)

in which at least one of the radicals R11, R12 and R13 is a hydrocarbon group having 1 to 10 C atoms which is substituted by a hydroxyl group, and optionally remaining radicals R11 to R13 are an unsubstituted hydrocarbon group having 1 to 10 C atoms.

In formula II, preferably all three radicals R11, R12 and R13 are a hydrocarbon group having 1 to 10 C atoms which is substituted by a hydroxyl group.

With particular preference the radicals R11, R12 and R13 independently of one another are a C2 to 010 hydroxyalkyl group.

With very particular preference the compound of the formula II is triethanolamine or triisopropanolamine.

The compound of the formula II acts as a catalyst (accelerator). It may be added separately or together with the amine hardeners to the epoxy resin composition.

The compound of the formula II is used preferably in amounts of 0.1 to 30 parts by weight, more preferably in amounts of 0.5 to 20 parts by weight, based on epoxy resins a).

Suitable further constituents of the epoxy resin compositions and of the hardener mixture also include catalysts other than those of the formula II which accelerate the curing reaction, examples being phosphonium salts of organic or inorganic acids, imidazole and imidazole derivatives, or quaternary ammonium compounds. Such other catalysts are used, if desired, in fractions of 0.01% to about 10% by weight, based on the total weight of the epoxy resin, the compound I, and hardeners. In one preferred embodiment, no such catalysts are needed, i.e., the amount of such catalysts in the composition is less than 0.5, in particular less than 0.1% by weight or less than 0.01% by weight.

With epoxy resin compositions, a fundamental distinction is made between one-component (1-pack) and two-component (2-pack) systems. With 2-pack systems, epoxy resin and hardener remain separate until shortly before curing (hence 2-pack); epoxy resin and hardener are highly reactive, and thus the hardener cannot be added until shortly before curing.

The process of the invention is more particularly a curing process for 2-pack systems.

The addition of the amine hardeners takes place, accordingly, not until shortly before use.

The two-component epoxy resin composition therefore comprises a separate binder composition, comprising a) an epoxy resin and
b) a compound of the formula I, and a separate hardener mixture composed of amine hardeners and a compound of the formula II.

In a preferred embodiment, the separate hardener mixture comprises c) a co-hardener
d) a hardener, and
e) a compound of the formula II Following addition of the hardener mixture, at the start of curing, the epoxy resin composition comprises, e.g., a) an epoxy resin,
b) a compound of the formula I,
c) a co-hardener,
d) a hardener, and
e) a compound of the formula II.

Curing may then be accomplished thermally by heating of the composition. Typically the curing of the epoxy resin compositions of the invention takes place at temperatures in the range from −10 to 200° C., preferably in the range from −10 to 180° C., and more particularly in the range from −10 to 150° C.

Alternatively, curing may also take place under induction by microwaves, for example. Curing takes place more particularly at −10 to 80° C. and in one particularly preferred embodiment at −10 to 40° C. or at −10 to 20° C. An advantageous feature is that curing may take place under standard ambient conditions such as room temperature and/or exposure to sunlight.

The process of the invention and the above-defined epoxy resin composition with constituents a) to e) can be used in a diversity of ways. The epoxy resin compositions are suitable in principle for all applications where 1-pack or 2-pack epoxy resin formulations are typically employed. They are suitable, for example, as a binder constituent in coating or impregnating materials, as adhesives, for producing composite materials, especially those based on carbon fiber materials or glass fiber materials, for producing moldings, or as casting compositions, especially as casting compositions for embedding, attaching or consolidating moldings. These and the observations below apply both to the 1-pack and the 2-pack systems; preferred systems, for all of the stated utilities, are the 2-pack systems.

Coating materials include, for example, paints. With the epoxy resin compositions of the invention (1-pack or 2-pack) and with the process of the invention it is possible in particular to obtain scratch-resistant protective paint coatings on any desired substrates, composed of metal, plastic or woodbase materials, for example.

Since the reactivity of the epoxy resin compositions is comparatively high, curing can be effected at low temperatures, as for example in the range from 0 to 50° C. and more particularly in the range from 5 to 35° C. This makes the epoxy resin compositions especially suitable for the coating of substrates of very large surface area, which cannot be heated, or can be heated only with difficultly, to temperatures above the ambient temperature. This includes in particular the coating of floors, particularly in highly trafficked areas, as for example for the coating of traffic areas in public buildings or squares, or for the coating of parking areas and vehicle ways to access points of parking areas. Particularly included here as well is the coating of large-surface-area metal components and metal constructions, such as in or on buildings or boats (marine coating), for example.

The epoxy resin compositions are also suitable as insulating coatings in electronic applications, as an insulating coating for wires and cables, for example. Their use for producing photoresists may also be mentioned. They are especially suitable, too, as refinish paint material, in connection, for example, with the repair of pipes without pipe disassembly (cure in place pipe (CIPP) rehabilitation). They are suitable as well for the sealing and coating of floors.

The epoxy resin compositions are also suitable as adhesives, e.g., 2-pack structural adhesives. Structural adhesives serve for the permanent joining of shaped parts to one another. The shaped parts may be made of any desired material; materials contemplated include plastic, metal, wood, leather, ceramic, etc. The adhesives may also be hot melt adhesives, which are fluid and processable only at elevated temperature. They may also be flooring adhesives. The compositions are also suitable as adhesives for producing printed circuit boards (electronic circuits), not least by the SMT (surface mounted technology) method.

The epoxy resin compositions are especially suitable also for producing composite materials. Composite materials (or composites) join different materials, e.g., plastics and reinforcing materials (fibers, carbon fibers), to one another through the cured epoxy resin.

The epoxy resin compositions are suitable, for example, for producing epoxy resin-impregnated fibers or for producing preimpregnated yarns and fabrics produced from fibers, as for example for producing prepregs which are processed further into composites. Production methods for composites include the curing of preimpregnated fibers or fiber fabrics (e.g., prepregs) after storage, or else extrusion, pultrusion, winding, and resin transfer molding (RTM) and resin infusion (RI) technologies. In particular, the fibers and/or the yarns and fabrics produced from them may be impregnated with the composition of the invention and thereafter cured at an elevated temperature.

As casting compositions for embedding, attaching or consolidating moldings, the epoxy resin compositions are used, for example, in electronic applications. They are suitable as flip-chip underfill or as electrical casting resins for potting, casting, and (glob-top) encapsulation.

The process of the invention is more particularly a method for the coating of surfaces which comprises applying the epoxy resin composition comprising constituents a) to d) to the surface to be coated, and curing it thereon. In terms of the surface to be coated, this coating method is not subject to any limitations. Examples of suitable surfaces are metal surfaces, wood surfaces, glass surfaces, and plastics surfaces. A skilled person is also able, however, by means of simple preliminary tests to determine whether other surfaces are suitable for coating in accordance with the method of the invention.

Particular advantages achieved through the inventively co-used compounds co-hardener the good performance properties, including more particularly the high cure rate.

EXAMPLES

1) Ingredients

Compound of formula I: 4,4-dimethyl-5-methylene-1,3-dioxolan-2-one

This compound was prepared in analogy to the instructions disclosed in DE 3233403.

As epoxy resins, the following substances were used:

Epoxy resin 1: Aromatic epoxy resin based on bisphenol A, having an epoxide equivalent of 182-192 g/eq and a viscosity at 25° C. in the range of 10-14 Pa s (Epilox A 19-03).

As hardeners, the following substances were used:

Phenalkamine (Mannich base of cardanol (Cardolite NC557))

As co-hardeners, the following substances were used:

Xylenediamine (MXDA)

As catalyst, triisopropanolamine and triethanolamine were used.

1) Performance Testing 1.1) Determination of the Gel Time

The gel time was determined by carrying out rheological investigations on the epoxy resin compositions. The reactivity of the compositions was determined by monitoring the course of reaction using a rheometer (in oscillation mode). For evaluation, the storage modulus measured, G', was plotted against the loss modulus G". The point of intersection of the two curves is the gel point. The corresponding time is the gel time. The gel time is a measure of the reactivity of the epoxy composition. The shorter the gel time, the higher the reactivity. For this purpose, the hardener and the co-hardener were added in the quantities indicated in the table to the epoxy resin and the mixture was immediately introduced into the measuring cell of the rheometer. The temperature was 23° C.

The total amount of hardener and co-hardener was selected such that the primary and secondary amino groups in total were present in stoichiometric amounts relative to the epoxy groups.

TABLE 1

Gel time (pbw) 23° C.

| Epoxy resin 1 [pbw] | Triethanolamine [pbw] | Phenalkamine [pbw] | Compound of the formula I [pbw] | Co-hardener Type | Co-hardener [pbw] | Gel time [min] |
|---|---|---|---|---|---|---|
| 1 | 10 | — | 3.6 | 1 | MXDA | 1.1 | 341 |
| 2 | 9 | 0.5 | 3.29 | 1 | MXDA | 0.5 | 314 |

TABLE 2

Gel time (pbw) 23° C.

| Epoxy resin 1 [pbw] | Triisopropanolamine [pbw] | Phenalkamine [pbw] | Compound of the formula I [pbw] | Co-hardener Type | Co-hardener [pbw] | Gel time [min] |
|---|---|---|---|---|---|---|
| 1 | 10 | — | 3.6 | 1 | MXDA | 1.1 | 341 |
| 2 | 9 | 0.5 | 3.29 | 1 | MXDA | 0.5 | 321 |

The invention claimed is:

1. A process for curing epoxy resins which comprises curing epoxy resin compositions comprising
   a) epoxy resins and
   b) a compound of the general formula I

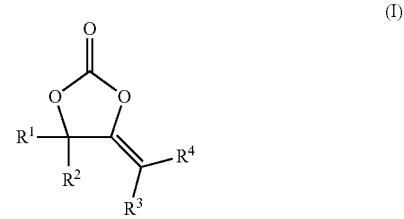

in which

R1 and R2 independently of one another are hydrogen, C1-C6-alkyl, C1-C4-alkoxy-C1-C4-alkyl, C5-C6-cycloalkyl, phenyl, phenyl-C1-C4-alkyl, C2-C6-alkenyl or C2-C6-alkynyl, or R1 and R2 together are a C3-C11-alkylene group;

R3 and R4 independently of one another are hydrogen, C1-C6-alkyl, C1-C4-alkoxy-C1-C4-alkyl, C5-C6-cycloalkyl, phenyl, phenyl-C1-C4-alkyl, C2-C6-alkenyl or C2-C6-alkynyl, or R3 and R4 together are a C4-C6-alkylene group;

wherein a) the epoxy resin and b) the compound of general formula I are first combined to form a mixture, followed by combining the mixture with one or more amino hardeners and a compound of the following formula II

in which at least one of the radicals R11, R12 and R13 is a hydrocarbon group having 1 to 10 C atoms, which is substituted with a hydroxyl group and optionally remaining radicals R11 to R13 are an unsubstituted hydrocarbon group having 1 to 10 C atoms; to form a curable composition; and curing the curable composition.

2. The process according to claim 1, wherein the epoxy resins are polyglycidyl ethers of aromatic, aliphatic or cycloaliphatic polyols.

3. The process according to claim 1, wherein R1 in formula I is selected from hydrogen and C1-C4-alkyl, and R2 in formula I is selected from C1-C4-alkyl and C1-C4-alkoxy-C1 C4-alkyl, or R1 and R2 together are a C4-C6-alkylene group.

4. The process according to claim 1, wherein R1 and R2 in formula I independently of one another are C1-C4-alkyl.

5. The process according to claim 1, wherein R3 and R4 are hydrogen.

6. The process according to claim 1, wherein 0.1% to 50% by weight of the amino hardeners being aliphatic, cycloaliphatic or aromatic amine compounds having 1 to 4 primary amino groups and optionally further functional groups, selected from secondary amino groups, tertiary amino groups, and hydroxyl groups, the primary amino groups in the case of the cycloaliphatic and aromatic amine compounds being attached as aminomethylene groups (H2N-

CH2—) to the cycloaliphatic or aromatic ring system (referred to below for short as co-hardeners).

7. The process according to claim 6, wherein the co-hardeners are used in amounts of 0.1 to 20 parts by weight, based on the epoxy resin a).

8. The process according to claim 6, wherein the other amine hardeners are selected from polyamidoamines, phenalkamines, epoxy-amine adducts, polyetheramines or other amine compounds different from the co-hardeners (referred to below for short as hardeners).

9. The process according to claim 1, wherein all three radicals R11, R12 and R13 in formula II are a hydrocarbon group having 1 to 10 C atoms which is substituted by a hydroxyl group.

10. The process according to claim 1, wherein the radicals R11, R12 and R13 independently of one another are C2 to C10 hydroxyalkyl groups.

11. The process according to claim 1, wherein the compound of the formula II is triethanolamine or triisopropanolamine.

\* \* \* \* \*